(12) United States Patent
Byron et al.

(10) Patent No.: US 10,902,478 B2
(45) Date of Patent: Jan. 26, 2021

(54) CREATIVE SUPPORT FOR AD COPY EDITORS USING LEXICAL AMBIGUITY

(71) Applicant: INTERNATIONAL BUSINESS MACHINES CORPORATION, Armonk, NY (US)

(72) Inventors: Donna K. Byron, Petersham, MA (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 15/714,590

(22) Filed: Sep. 25, 2017

(65) Prior Publication Data

US 2019/0095960 A1    Mar. 28, 2019

(51) Int. Cl.
| | | |
|---|---|---|
| *G06Q 30/02* | (2012.01) | |
| *G06N 20/00* | (2019.01) | |
| *G06F 16/951* | (2019.01) | |
| *G06F 16/9535* | (2019.01) | |
| *G06F 40/295* | (2020.01) | |

(52) U.S. Cl.
CPC ....... *G06Q 30/0276* (2013.01); *G06F 16/951* (2019.01); *G06F 16/9535* (2019.01); *G06F 40/295* (2020.01); *G06N 20/00* (2019.01); *G06Q 30/0277* (2013.01)

(58) Field of Classification Search
None
See application file for complete search history.

(56) References Cited

U.S. PATENT DOCUMENTS

| | | | |
|---|---|---|---|
| 8,719,713 B2 | 5/2014 | Esposito et al. | |
| 2010/0023397 A1* | 1/2010 | Goldman | G06Q 30/0256 705/14.48 |
| 2010/0293048 A1 | 11/2010 | Singolda et al. | |
| 2011/0119125 A1 | 5/2011 | Javangula et al. | |
| 2015/0095770 A1* | 4/2015 | Mani | G06F 16/93 715/254 |
| 2015/0134445 A1 | 5/2015 | Pasila et al. | |
| 2015/0269857 A1* | 9/2015 | Feng | H04W 4/029 434/353 |

(Continued)

OTHER PUBLICATIONS

C. Sujith Ravi et al., "Automatic Generation of Bid Phrases for Online Advertising", retrieved from file:///C:/Users/srefai/Documents/e-Red%20Folder/15714590/automatic%20generation%20of%20bid%20phrases%20for%20online%20advertising.pdf (Year: 2009).*

(Continued)

*Primary Examiner* — Sam Refai
(74) *Attorney, Agent, or Firm* — Robert D. Bean (57) ABSTRACT

According to one embodiment, a method, computer system, and computer program product for generating an advertisement is provided. The present invention may include receiving domain corpora; identifying domain-specific terms within each domain comprising the received domain corpora; scoring the identified domain-specific terms based on each of the domains; generating candidate short phrases comprising at least one of the scored domain-specific terms based on the scoring of the scored domain-specific terms; scoring the candidate short phrases; and selecting candidate short phrases based on the scoring of the candidate short phrases.

14 Claims, 5 Drawing Sheets

(56) References Cited

U.S. PATENT DOCUMENTS

2018/0060921 A1* 3/2018 Mengle .............. G06Q 30/0276

OTHER PUBLICATIONS

Mell et al., "The NIST Definition of Cloud Computing," National Institute of Standards and Technology, Sep. 2011, p. 1-3, Special Publication 800-145.

Lew, "An ambiguity-based theory of the linguistic verbal joke in English", A Thesis submitted to the faculty of Adam Mickiewicz University in partial fulfilment of the requirements for the degree of Doctor of Philosophy, Apr. 1996, pp. 1-72.

Ritchie, "Current Directions in Computational Humour", Artificial Intelligence Review, Oct. 2001, vol. 16, Issue 2, pp. 119-135, copyright 2001 Kluwer Academic Publishers, Printed in the Netherlands, *An earlier version of this paper was presented at the 7th IEEE International Workshop on Robot and Human Communication, Takamatsu, Japan, Oct. 1998.

Stock et al., "The April Fools' Day Workshop on Computation Humour", Proceedings of the Twentieth Twente Workshop on Language Technology (TWLT20), An Initiative of Hahacronym European Project IST-2000-30039, Apr. 15-16, 2002, Trento, Italy, pp. 1-169.

Dybala et al., "Humor Prevails!—Implementing a Joke Generator into a Conversational System", Australasian Joint Conference on Artificial Intelligence, Al 2008: Advances in Artificial Intelligence, Conference Paper, Part of the Lecture Notes in Computer Science book series, LNCS, vol. 5360, pp. 214-225.

Cardoso et al., "Computational Creativity" Goldsmiths University of London, Proceedings of the 4th International Joint Workshop on Computational Creativity, Jun. 17-19, 2007, pp. 1-154.

Ranjbar et al., "Mahtab at SemEval-2017 Task 2: Combination of Corpus-based and Knowledge-based Methods to Measure SemanticWord Similarity", Proceedings of the 11th International Workshop on Semantic Evaluations (SemEval'2017), pp. 256-260, Vancouver, Canada, Aug. 3-4, 2017, c 2017 Association for Computational Linguistics.

* cited by examiner

CREATIVE SUPPORT FOR AD COPY EDITORS USING LEXICAL AMBIGUITY

BACKGROUND

The present invention relates, generally, to the field of computing, and more particularly to digital advertising.

Digital advertising is a field of marketing which leverages the reach and content of the internet to deliver marketing messages to consumers. It includes email marketing, search engine marketing, social media marketing, mobile advertising, and many types of display advertising. Display advertising comes in a variety of forms including web banners, which are graphical ads displayed within a web page; pop-up ads, which open above a website visitor's initial browser window; floating ads, which are ads that appear superimposed over the requested website's content; expanding ads, which change dimensions upon a predefined condition, such as a preset amount of time a visitor spends on a webpage, movement over the ad, etc.; and news feed ads, which typically exist on social media platforms that offer a steady stream of information updates. These ads may consist of video, audio, pictures and/or text, and serve to promote awareness of a brand or to increase a visitor's intention to buy a product or service. With access to the internet expanding to a massive portion of the world's population since the internee's creation, digital advertising has become a massive revenue source for advertising agencies, webpage owners, and digital content creators alike.

SUMMARY

According to one embodiment, a method, computer system, and computer program product for generating an advertisement is provided. The present invention may include receiving domain corpora; identifying domain-specific terms within each domain comprising the received domain corpora; scoring the identified domain-specific terms based on each of the domains; generating candidate short phrases comprising at least one of the scored domain-specific terms based on the scoring of the scored domain-specific terms; scoring the candidate short phrases; and selecting candidate short phrases based on the scoring of the candidate short phrases.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to digital advertising. The following described exemplary embodiments provide a system, method, and program product to, among other things, generate an advertisement containing one or more words whose lexical ambiguity covers both the domain of an advertised product and the domain of an advertising platform. Therefore, the present embodiment has the capacity to improve the technical field of digital advertising by automating the advertisement generation process for programmatic advertising and increasing the relevance of the ad, thereby promoting user engagement, increasing click-through rates, and even priming the reader's subconscious eye-fixations to be more likely to settle on an advertisement as the user scans the page.

As previously described, digital advertising is a field of marketing which leverages the internet to deliver marketing messages to consumers. It includes email marketing, search engine marketing, social media marketing, mobile advertising, and many types of display advertising. Display advertising comes in a variety of forms including web banners, which are graphical ads displayed within a web page; pop-up ads, which open above a website visitor's initial browser window; floating ads, which are ads that appear superimposed over the requested website's content; expanding ads, which change dimensions upon a predefined condition, such as a preset amount of time a visitor spends on a webpage, movement over the ad, etc.; and news feed ads, which typically exist on social media platforms that offer a steady stream of information updates. These ads may consist of video, audio, pictures and/or text, and serve to promote awareness of a brand or to increase a visitor's intention to buy a product or service. With access to the internet expanding to a massive portion of the world's population since the internee's creation, digital advertising has become a massive revenue source for advertising agencies, webpage owners, and digital content creators alike.

Given the small amount of real estate occupied by many online ads on web and mobile devices, finding the right headline and visuals is essential to catch viewers' attention. Advertisers tend to focus on certain words or constructs that have been found to produce high click-through rates (e.g. "you won't believe", "don't miss", "important", "don't wait", et cetera). However, these words are not related to the content of the ad, and viewers become accustomed to them fairly quickly. Similarly, ad visuals are generally disconnected from the contents of the hosting site. Only on rare occasions do the advertisers and the host site work together on common messages. As such, it may be advantageous to, among other things, implement a system that helps advertisement copy editors find headlines and visuals that blend the domains of both the advertised product and of the advertising platform, and to automate this process for programmatic advertising.

According to one embodiment, a method of scanning a corpus of content files for an advertised product and the content of an advertising platform to identify domain-specific terms from each domain separately, identify common terms that are domain specific in both domains, generate short phrases in both domains that use the common terms, score the phrases by relevance, and choose the most relevant terms to produce a term that bridges the domain of the advertisement and the domain of the advertising platform is provided. The term is then inserted into headlines and visuals to increase the relevance of the ad, thereby promoting user engagement, increasing click-through rates, and even priming the reader's subconscious eye-fixations to be more likely to settle on the advertisement as the user scans the page.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate an advertisement containing one or more words whose lexical ambiguity covers both the domain of an advertised product and the domain of an advertising platform.

Figure 1:
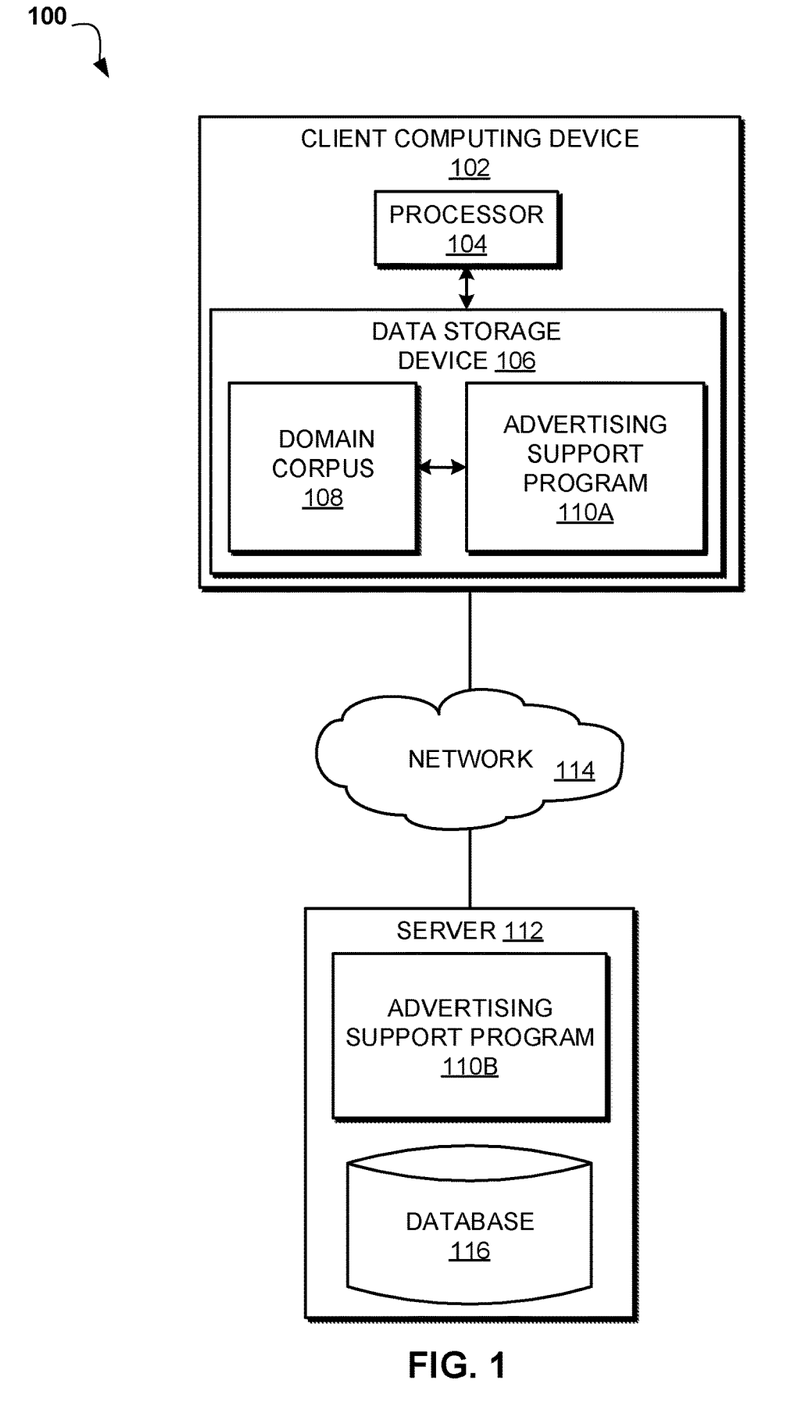
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host domain corpus 108, and enabled to host and run advertising support program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, a smart toaster, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an advertising support program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, domain corpus 108 may be a collection of content files, including text, video, and image formats, pertaining to any number of domains. The domains may include at least one product domain, which may be a collection of content files pertaining to a product or service (e.g., food) which is intended to be the subject of an advertisement. Content files within the product domain, where the advertised product is a food item, may include recipes for food products, FAQs, catalogs for consumer products, existing advertisements for similar food products, et cetera. The domains may further include at least one host domain, which may be a collection of content files pertaining to a platform where the advertised product or service will be advertised (e.g., a weather forecasting site). The content files pertaining to the advertising platform may include content from the platform, such as articles, surveys, et cetera, as well as past marketing material hosted by the platform for similar purposes, or other information relevant to advertising the advertised product. Domain corpus 108 may further include any information useful for training machine learning models, such as performance metrics for various advertising phrases, images, or terms, glossaries of related terms pertaining to a given domain, et cetera. Domain corpus 108 may be a single collection of data or may be a separate body of content files for each advertised product and advertising platform. While some embodiments of this invention contemplate two domains, alternate embodiments may utilize any number of domains. This may be useful where there are multiple related products to be displayed on a single platform, where one or more products are to be advertised on multiple domains, or any other combination thereof. Furthermore, domains beyond the product and host domains may be employed, such as domains pertaining to a country, industry, class of product, or any other context within which a product or service may be advertised. Domain corpus 108 may be received from an advertiser or other such entity, or may be obtained directly from a website, database, or other online repository. Domain corpus 108 may be located in any data repository accessible to advertising support program 110A, 110B, such as data storage device 106 or database 116.

According to the present embodiment, the advertising support program 110A, 110B may be a program enabled to generate an advertisement comprising one or more words whose lexical ambiguity covers both the domain of an advertised product and the domain of an advertising platform. The advertising support program 110A, 110B may further be capable of selecting a relevant media element to be paired with the generated phrase. The advertisement generation method is explained in further detail below with respect to FIG. 2. The advertising support program 110A, 110B may be run on either the client computing device 102, or server 112.

Figure 2:
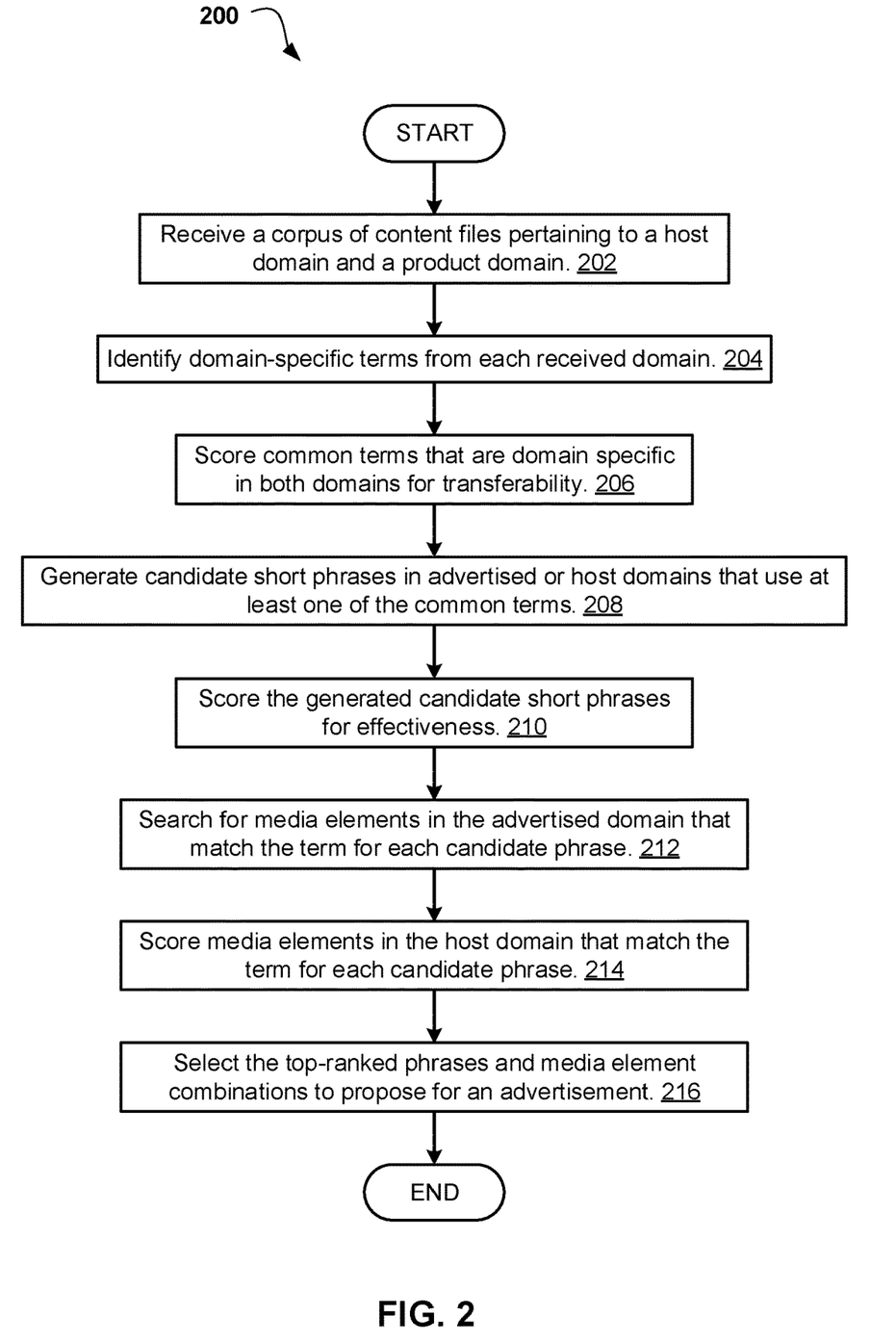
FIG. 2 is an operational flowchart illustrating an advertisement generation process according to at least one embodiment.

Referring now to FIG. 2, an operational flowchart illustrating an advertisement generation process 200 is depicted according to at least one embodiment. At 202, the advertising support program 110A, 110B receives domain corpus 108 of content files pertaining to a host domain and a product domain. The advertising support program 110A, 110B may receive domain corpus 108 from any repository, program or computer in communication with communication network 114. The advertising support program 110A, 110B may also receive multiple domain corpora 108, or receive different elements of domain corpus 108 from different sources. Domain corpus 108 may be pre-processed, or advertising support program 110A, 110B may parse text content files in domain corpus 108 itself using natural language processing. The advertising support program 110A, 110B may also harvest terms from video or image content of domain corpus 108 using image or video processing and may use image recognition or computer vision analysis to obtain a text description of video or images.

Next, at 204, advertising support program 110A, 110B identifies domain-specific terms from each parsed domain. Domain-specific terms may be any terms that are relevant to the domain from which they were extracted; for example, if the domain in question is a weather forecasting site, domain specific terms may include weather-related terms, such as "sunny", "rainy", "weather", et cetera. If the advertised product domain is that of a food product, domain specific terms may include food and eating related terms, such as "tasty", "wholesome", "frosted", et cetera. A term may be determined to be 'domain-specific' by counting the number of times the term appears in a domain; the more times the term appears the more likely the term is to be specific to that domain. The particular number of times a term must appear to be considered 'domain specific' may vary according to user preference. It may need to appear only once in a domain to be considered domain-specific, or, if the user desires to ensure a stronger potential relationship between a term and a domain, the term may need to appear multiple times. In an alternate embodiment, advertising support program 110A, 110B may receive a glossary of related terms for any given domain, and may check terms appearing in either domain from the domain corpus against the terms in the glossary to identify related terms. One example of a glossary of related terms may be a news corpus, which is what natural language parsers are typically trained on.

Then, at 206, advertising support program 110A, 110B scores common terms that are domain specific in both domains for transferability. Common terms are terms that may be specific to each domain of domain corpus 108. The scoring enumerates the transferability, or ambiguity, of a common term such that it could apply to each domain, with a high score representing a high or strong level of applicability to each domain, and a low score representing a low or tenuous applicability to all or any one or more of the domains. The scoring may be based on any factors that may indicate a relationship to each domain; if advertising support program 110A, 110B independently determines the same term to be domain-specific to each of the domains of domain corpus 108, advertising support program 110A, 110B may score that term very highly. However, when the relationship of the term to each domain is not so clear, more subtle factors must be considered to determine a relationship between a term and a domain for scoring purposes; these factors may include spelling similarity between terms, phonemic similarity (e.g., 'reign' and 'rain'), or semantic distance. Semantic distance may involve the difference between the meanings of any given term in the context of each respective domain. Semantic difference may be ascertained by replacing a term with a synonym used in the first domain, and checking whether the synonym is also used in the second domain, or through other semantic distance techniques, such as calculating cosine distance using vectors of word embeddings or other corpus statistics.

Next, at 208, advertising support program 110A, 110B generates candidate short phrases in advertised or host domains that use at least one of the common terms. The advertising support program 110A, 110B may use any natural language generation technique to assemble phrases containing the terms. The advertising support program 110A, 110B may also generate candidate short phrases by looking for examples from any domain in domain corpus 108, or any supplemental corpus or example material, which includes the selected term. The advertising support program 110A, 110B may further perform text simplification on the candidate phrasing to shorten the phrasing, reduce the phrase if it contains multiple clauses, or remove complements.

Then, at 210, the advertising support program 110A, 110B scores the candidate phrases for effectiveness. Effectiveness may be determined through any number or combination of factors that may improve the influence of the phrase on viewers. For example, effectiveness may include effectiveness as established by traditional advertising metrics, such as click-through rates, engagement rates, visits, and other such metrics of advertisements featuring similar phrases or phrases including the same or similar domain-specific terms. Effectiveness may also be based on the lexical features, grammar, and syntactical construction of the candidate phrase, including lexical humor, phrase length, coherence markers (pronouns, 'this', et cetera), action-oriented verbs, or word embeddings. The advertising support program 110A, 110B may also construct a deep learning model to score candidate phrases. These deep learning models may be any machine learning method, and may accept training data including an example corpus of advertising materials or data from the advertised domain, existing headlines or ad taglines from any domain, and syntactical, grammatical, or lexical guidelines or samples from any source. This information may be received by advertising support program 110A, 110B as part of domain corpus 108, may be received separately, or may be retrieved from a data repository by advertising support program 110A, 110B.

Next, at 212, advertising support program 110A, 110B searches for media elements in the advertised domain that match the term for each candidate phrase. Media elements may be any non-text media, such as video or images. The advertising support program 110A, 110B may use an image captioning service or image search engine to find images that are tagged with, contain, or are relevant to terms within the candidate phrase. Advertising support program 110A, 110B may also use an image captioning or image search engine to find image frames from a video, or may search for video content using a video search engine, that are tagged with, contain, or are relevant to terms within the candidate phrase. Advertising support program 110A, 110B may also render video content into terms to compare against terms in the candidate phrase by performing computer vision analysis to produce textual descriptions, by examining captions or other metadata, or by using a speech-to-text utility to pull spoken language out of the video file. Media elements may be provided by advertisers, advertising platforms, or other entities for advertising purposes as part of domain corpus 108 or any other exemplary or supplementary corpus of materials, in which case such media elements may be automatically considered domain-specific. Media elements not part of a corpus directed to a domain may also be considered to be within an advertised domain if they are relevant to or appear within the context of that domain, as may be evidenced by media tags, headlines, keywords, context clues, et cetera.

Then, at 214, advertising support program 110A, 110B scores media elements in the host domain that match the term for each candidate phrase. The score is a representation of how 'ad-like' a media element is, where a media element is more 'ad-like' the more clicks it generates. In other words, the score is a measure of the click-through rate a media element is capable of generating. Higher scores mean a media element attracts greater attention, and is therefore more desirable for advertising purposes. To score the media elements, advertising support program 110A, 110B may first convert the images or image frames of a video into feature vectors, and send the feature vectors to a supervised machine learning model that returns a score. Many machine learning models will suffice, including image memorability models and ad click prediction models. In another embodiment, advertising support program 110A, 110B may train a machine learning model by collecting data from previous ads.

Next, at 216, advertising support program 110A, 110B selects the top ranked phrases and media element combinations to propose an advertisement. For example, in the context of eggs being advertised on a weather forecasting site, a phrase may be "it's going to be sunny" along with an image of sunny-side-up eggs, or a short video of sunny-side-up eggs on a skillet. The advertising support program 110A, 110B may supply the media element and phrase to the user separately, or may combine them. The advertising support program 110A, 110B may simply overlay the phrase onto the media element at a preselected point, or may use image or video processing to determine a suitable region to place the phrase within the media element.

It may be appreciated that FIG. 2 provides only an illustration of one implementation and does not imply any limitations with regard to how different embodiments may be implemented. Many modifications to the depicted environments may be made based on design and implementation requirements.

Figure 3:
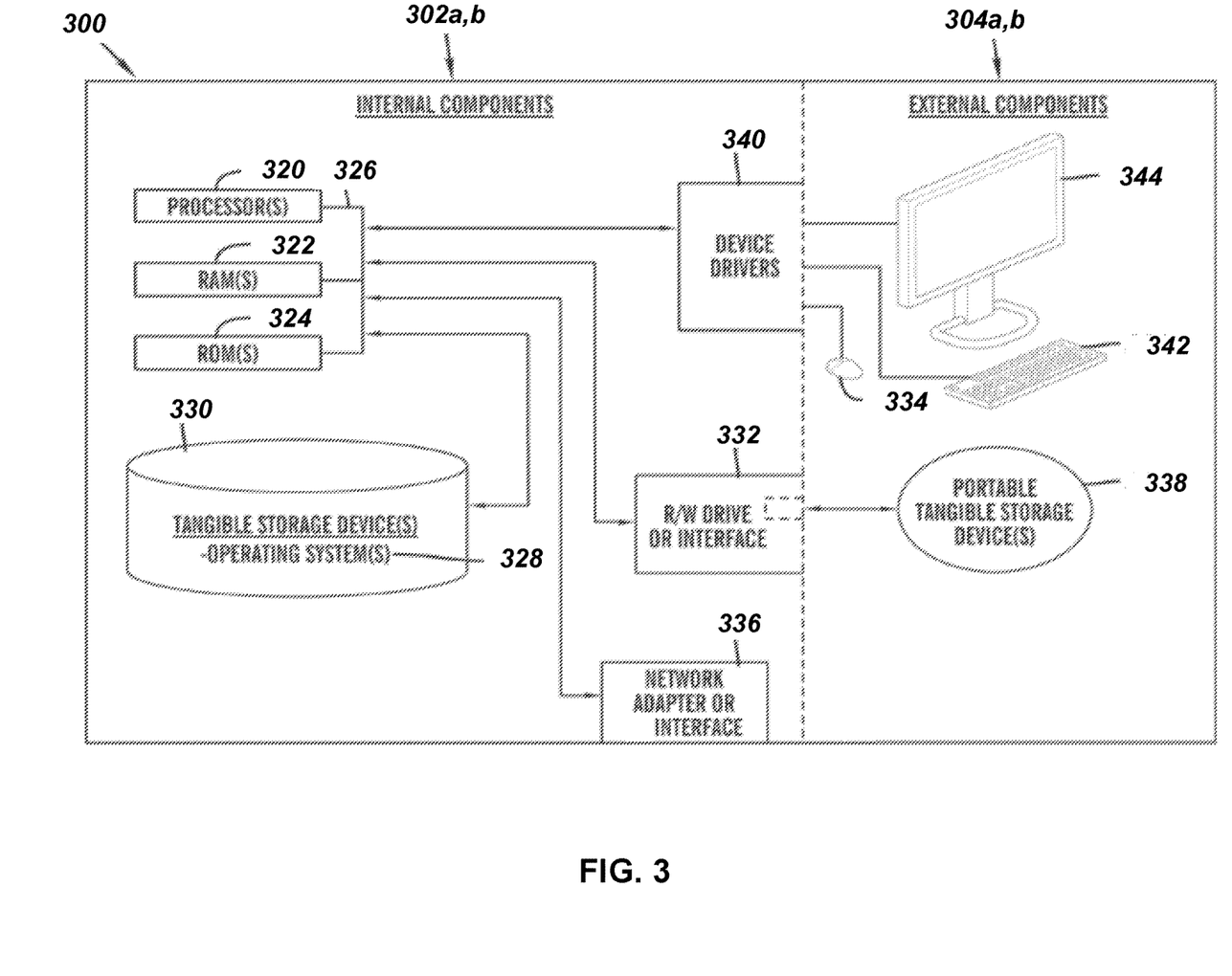
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the advertising support program 110A in the client computing device 102, and the advertising support program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the advertising support program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The domain corpus 108 and the advertising support program 110A in the client computing device 102 and the advertising support program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the domain corpus 108 and the advertising support program 110A in the client computing device 102 and the advertising support program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
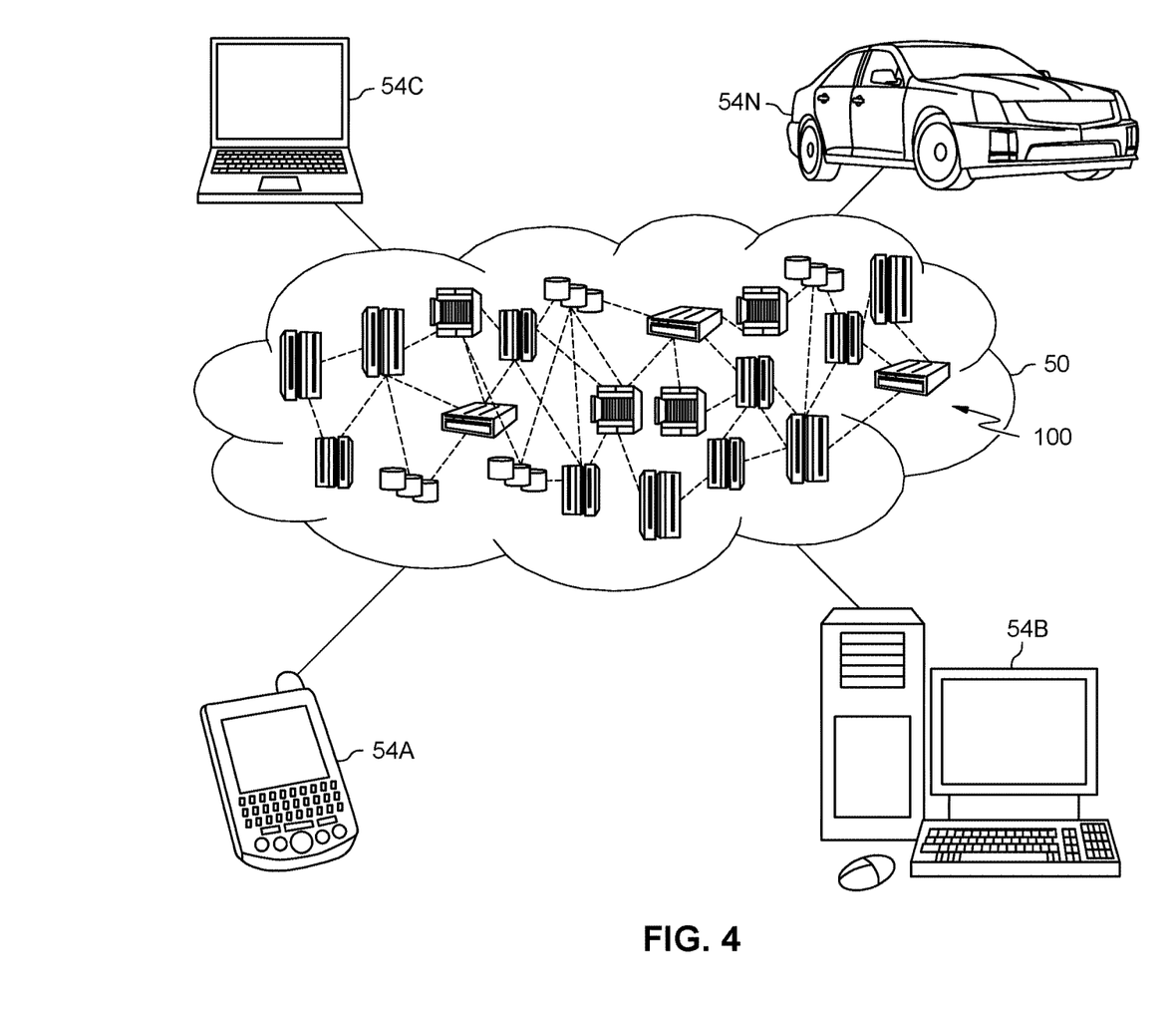
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
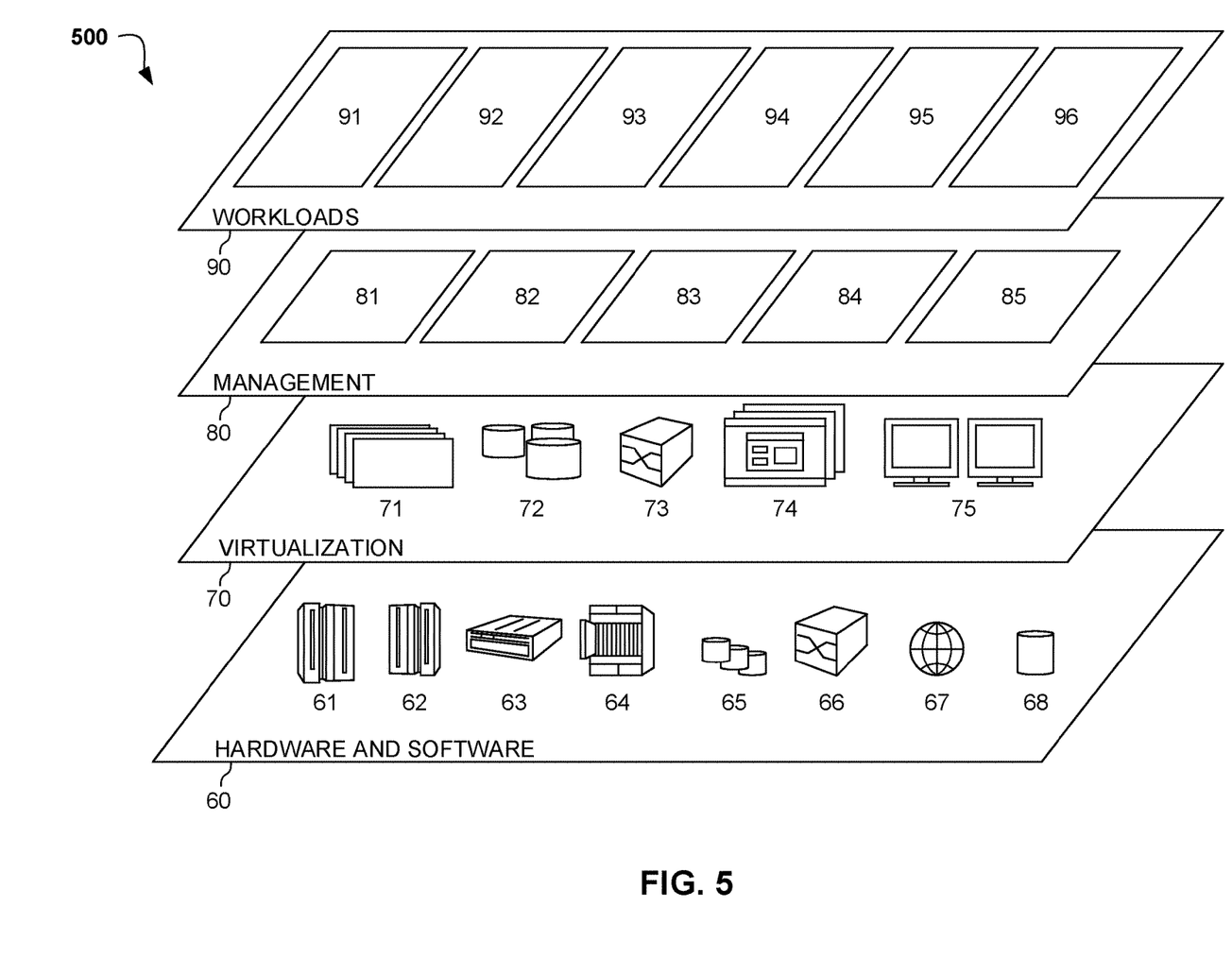
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and advertisement generation 96. Advertisement generation 96 may relate to generating an advertisement containing one or more words whose lexical ambiguity covers both the domain of an advertised product and the domain of an advertising platform.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for advertisement generation, the method comprising:
   identifying one or more domain-specific terms within each of a plurality of domains;
   scoring the one or more identified domain-specific terms based on an extent to which the identified domain specific terms apply to at least two of the plurality of domains;
   generating one or more candidate short phrases comprising one or more scored domain-specific terms based on the scoring of the one or more scored domain-specific terms;
   scoring the one or more generated candidate short phrases for effectiveness;
   selecting a scored candidate short phrase of the one or more scored candidate short phrases based on the scoring of the one or more candidate short phrases;
   searching for one or more media elements in the plurality of domains that match the one or more scored domain-specific terms within the one or more candidate short phrases;
   scoring the one or more searched media elements;
   digitally combining one or more of the scored media elements and one or more of the scored candidate short phrases based on the scoring of both the one or more scored candidate short phrases and the one or more scored media elements.

2. The method of claim 1, wherein the one or more searched media elements are scored using a supervised machine learning model which is trained to assign a score to the one or more searched media elements based on predicting a number of clicks that the one or more searched media elements are capable of generating.

3. The method of claim 1, wherein the scoring of the one or more of domain-specific terms and the scoring of the one or more candidate short phrases is performed by one or more supervised machine learning models.

4. The method of claim 1, wherein the plurality of domains comprise at least one product domain and at least one host domain.

5. The method of claim 1, wherein the one or more generated candidate short phrases are scored based on one or more factors, wherein the one or more factors are selected from a group consisting of click-through rates, engagement rates, and visits.

6. A computer system for advertisement generation, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying one or more domain-specific terms within each of a plurality of domains;
   scoring the one or more identified domain-specific terms based on an extent to which the identified domain specific terms apply to at least two of the plurality of domains;
   generating one or more candidate short phrases comprising one or more scored domain-specific terms based on the scoring of the one or more scored domain-specific terms;
   scoring the one or more generated candidate short phrases for effectiveness;
   selecting a scored candidate short phrase of the one or more scored candidate short phrases based on the scoring of the one or more candidate short phrases;
   searching for one or more media elements in the plurality of domains that match the one or more scored domain-specific terms within the one or more candidate short phrases;
   scoring the one or more searched media elements; and
   digitally combining one or more of the scored media elements and one or more of the scored candidate short phrases based on the scoring of both the one or more scored candidate short phrases and the one or more scored media elements.

7. The computer system of claim 6, wherein the one or more searched media elements are scored using a supervised machine learning model which is trained to assign a score to the one or more searched media elements based on predicting a number of clicks that the one or more searched media elements are capable of generating.

8. The computer system of claim 6, wherein the scoring of the one or more of domain-specific terms and the scoring of the one or more candidate short phrases is performed by one or more supervised machine learning models.

9. The computer system of claim 6, wherein the plurality of domains comprise at least one product domain and at least one host domain.

10. The computer system of claim 6, wherein the one or more generated candidate short phrases are scored based on one or more factors, wherein the one or more factors are selected from a group consisting of click-through rates, engagement rates, and visits.

11. A computer program product for advertisement generation, the computer program product comprising:

one or more computer-readable tangible storage medium and program instructions stored on at least one of the one or more tangible storage medium, the program instructions executable by a processor to cause the processor to perform a method comprising:

identifying one or more domain-specific terms within each of a plurality of domains;

scoring the one or more identified domain-specific terms based on an extent to which the identified domain specific terms apply to at least two of the plurality of domains;

generating one or more candidate short phrases comprising one or more scored domain-specific terms based on the scoring of the one or more scored domain-specific terms;

scoring the one or more generated candidate short phrases for effectiveness;

selecting a scored candidate short phrase of the one or more scored candidate short phrases based on the scoring of the one or more candidate short phrases;

searching for one or more media elements in the plurality of domains that match the one or more scored domain-specific terms within the one or more candidate short phrases;

scoring the one or more searched media elements; and digitally combining one or more of the scored media elements and one or more of the scored candidate short phrases based on the scoring of both the one or more scored candidate short phrases and the one or more scored media elements.

12. The computer program product of claim 11, wherein the one or more searched media elements are scored using a supervised machine learning model which is trained to assign a score to the one or more searched media elements based on predicting a number of clicks that the one or more searched media elements are capable of generating.

13. The computer program product of claim 11, wherein the scoring of the one or more of domain-specific terms and the scoring of the one or more candidate short phrases is performed by one or more supervised machine learning models.

14. The computer program product of claim 11, wherein the plurality of domains comprise at least one product domain and at least one host domain.

* * * * *